May 10, 1932.   L. SAIVES   1,857,696
DOOR OF ROAD VEHICLES
Filed Nov. 15, 1928
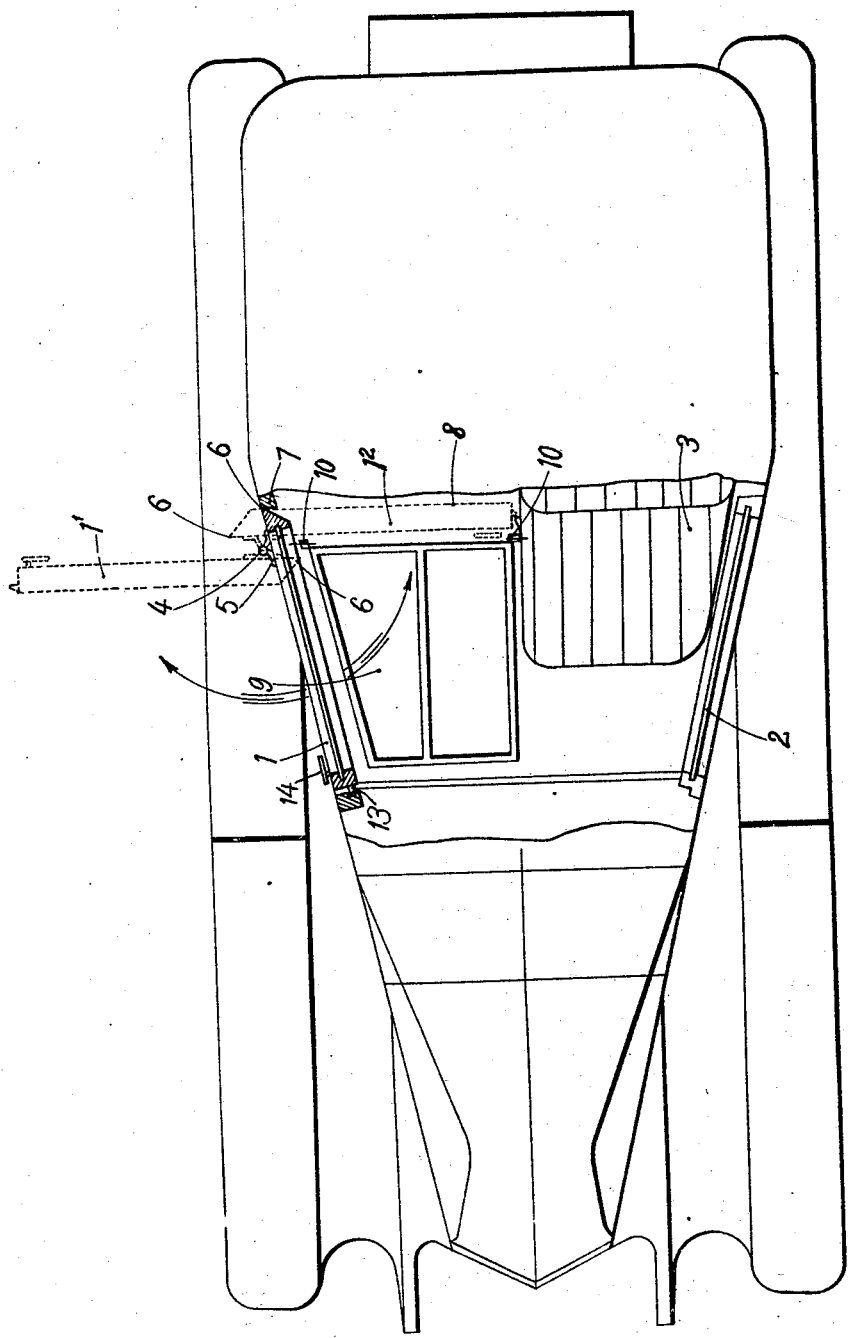

Patented May 10, 1932

1,857,696

UNITED STATES PATENT OFFICE

LÉON SAIVES, OF BILLANCOURT, FRANCE, ASSIGNOR TO LOUIS RENAULT, OF BILLANCOURT, SEINE, FRANCE

DOOR OF ROAD VEHICLES

Application filed November 15, 1928, Serial No. 319,545, and in France December 19, 1927.

The invention relates to an arrangement for fitting the doors of the coach bodies of self-propelled vehicles, the principal application of which in the case of transport vehicles is to be front doors of torpedo bodies with inside drive on that side not occupied by the driver, for the purpose of enabling the door to be turned back against the front partition into a position in which it does not interfere with the placing of trunks or luggage in the free compartment beside the driver.

According to the invention the door is hung on a pivoting axle located in such way that it is possible, when the door is not in use, to turn it back against the back of the seat or the front partition to which it is held by any suitable locking device. This pivoting axle is arranged outside the plane of the door and projects slightly from the side of the coach body, and is located, not upon the vertical edge of the door, but slightly to the inside in such manner that the part comprised between the pivoting axle and the outer edge of the door, when shut, fills up the space comprised between the pivoting axle and the coach body. The inner edge projects very slightly on the side of the coach body, when the door is turned back against the front partition when not in use, without however any risk to the traffic, since the amount of this projection is always less than the maximum width of the coach body.

Owing to this method of hanging, the front door can be stowed away inside the coach body, thus affording a passage of maximum width for putting in luggage and trunks beside the driver.

The accompanying drawing shows a plan view of a self-propelled vehicle fitted with a door according to the invention. On referring to the drawing it will be seen that the vehicle illustrated comprises a coach body with inside drive and provided with front doors 1 and 2, the driver's seat being shown at 3. The pivoting axle 4 of the right-hand front door, in the construction shown by way of example, projects from the side of the coach body and is provided with articulated hinges 5 connected to the door 1. The pivoting axle is thus not located in the plane of the door and this axle moreover is not upon the inside vertical edge 6 of the door, the door extending slightly towards the rear of the pivoting axle 4, in such way that in the normal closed position of the door, the edge 6 abuts against the coach body at 7.

The door is shown open at 1′ and turned back towards the inside, at 1² against the front partition 8, in the position when not in use.

The door can be held in this position by means of any suitable locking device.

In the construction shown by way of example in the drawing there is provided for this purpose a grating 9 which normally rests on the floor of the vehicle. To hold the door in its position when not in use this grating, which is attached by a hinge at 10 to the floor, is turned upwards and locked in a suitable way. It thus holds the door in position and also serves to protect the paint on the door from any damage which might be caused when the trunks or luggage are placed in the compartment by the side of the driver.

The front edge of the door is equipped with a spring latch 13, which fits into the customary socket and detachably holds the door in closed position. The usual retaining strip which normally prevents further inward movement of the door is omitted in this construction however, and the release of the latch, by operation of the handle 14, permits the door to be swung inwardly, to occupy the dotted line position illustrated.

I claim:

1. A car having a driver's seat, a door pivotally mounted for movement to a position inside or outside of the car, and a grating pivotally mounted within the car and adapted for movement to a position covering the door when the latter is inside the car.

2. A car having a driver's seat and a luggage compartment beside said seat, a door pivotally mounted for movement into said compartment, and a grating pivotally mounted inside the car and movable to a position to cover said door.

In testimony whereof he has signed this specification.

LÉON SAIVES.